United States Patent
Bunton et al.

(10) Patent No.: US 6,765,922 B1
(45) Date of Patent: Jul. 20, 2004

(54) SPECULATIVE TRANSMIT FOR SYSTEM AREA NETWORK LATENCY REDUCTION

(75) Inventors: William P. Bunton, Pflugerville, TX (US); David A. Brown, Austin, TX (US); John C. Krause, Georgetown, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 657 days.

(21) Appl. No.: 09/671,938

(22) Filed: Sep. 27, 2000

Related U.S. Application Data

(60) Provisional application No. 60/231,722, filed on Sep. 8, 2000.

(51) Int. Cl.[7] .............................................. H04L 12/54
(52) U.S. Cl. ..................... 370/428; 370/429; 370/395.7; 370/395.71; 370/395.72; 370/338; 370/428; 711/109; 711/132; 710/52; 710/53; 710/56; 710/57; 710/310; 700/14; 700/33; 700/306
(58) Field of Search ............................. 370/338, 395.7, 370/395.71, 395.72, 428, 429, 411, 412, 415, 417; 700/306, 14, 33, 34; 711/109, 132; 710/52, 53, 56, 57, 310

(56) References Cited

U.S. PATENT DOCUMENTS

| | | | |
|---|---|---|---|
| 5,208,810 A | 5/1993 | Park | 370/91.1 |
| 5,268,900 A | 12/1993 | Hluchyj et al. | 370/94.1 |
| 5,307,345 A * | 4/1994 | Lozowick et al. | 370/428 |
| 5,483,526 A * | 1/1996 | Ben-Nun et al. | 370/395.7 |
| 5,557,751 A | 9/1996 | Banman et al. | 395/250 |
| 5,574,849 A | 11/1996 | Sonnier et al. | 395/182.1 |
| 5,675,579 A | 10/1997 | Watson et al. | 370/248 |
| 5,694,121 A | 12/1997 | Karuse et al. | 340/825.5 |
| 5,710,549 A | 1/1998 | Horst et al. | 340/825.5 |
| 5,867,501 A | 2/1999 | Horst et al. | 370/474 |
| 6,466,579 B1 * | 10/2002 | Scott et al. | 370/395.71 |
| 6,515,963 B1 * | 2/2003 | Bechtolsheim et al. | 370/229 |

* cited by examiner

Primary Examiner—Wellington Chin
Assistant Examiner—Mark A Mais

(57) ABSTRACT

A speculative transmit function, utilizing a configurable logical buffer, is implemented in a network. When a transmission is started the logical buffer is configured as a FIFO to reduce transmit latency. If a data under-run lasts for more than a fixed time interval the transmission is abandoned and the logical buffer is reconfigured as a STORE-AND-FORWARD buffer. The transmission is restarted after all transmit data is buffered.

4 Claims, 6 Drawing Sheets

SPECULATIVE TRANSMIT FOR SYSTEM AREA NETWORK LATENCY REDUCTION

This application claims the benefit of Provisional application Ser. No. 60/231,722, filed Sep. 8, 2000.

BACKGROUND OF THE INVENTION

A System Area Network (SAN) is used to interconnect nodes within a distributed computer system, such as a cluster. The SAN is a type of network that provides high bandwidth, low latency, communication with a very low error rate. SANs often utilize fault-tolerant technology to assure high availability. The performance of a SAN resembles a memory subsystem more than a traditional local area network (LAN).

The preferred embodiments will be described implemented in the ServerNet™ architecture, manufactured by the assignee of the present invention, which is a layered transport protocol for a System Area Network (SAN). A single session layer may support one or two ports, each with its associated transaction, packet, link-level, MAC (media access) and physical layer. The layer designated the "session layer" in the ServerNet™ description corresponds to the transaction layer described in other layered network protocols. Similarly, routing nodes with a common routing layer may support multiple ports, each with its associated link-level, MAC and physical layer.

Each node includes duplex ports connected to the physical link. A link layer protocol (LLP) manages the flow of status and packet data between ports on independent nodes. The ServerNet™ II link layer protocol is a set of protocols, running concurrently to manage the flow of status and packet data between ports. Two types of symbols are used on a link, data symbols and command symbols. Data symbols are used to transport packet data. Commands are used to implement link management and control functions.

Each ServerNet™ port continuously transmits signals so that the port's status can always be checked. IDLE command signals are transmitted between packets. The ServerNet™ protocol requires that packets be transmitted as a continuous stream of data symbols or FILL command symbols. Thus, if transmit data is unavailable (data under-run) a packet is extended by transmitting FILL symbols until additional data becomes available. Data under-run can result due to transmission from an end-node with low bandwidth or high memory latency. Such end-nodes may not be capable of sustaining a ServerNet™ data stream without buffering.

The extension of a packet by FILL symbols can result in fabric congestion as depicted in FIG. 1. In FIG. 1 the packet traveling from node #0 to node #14 has been extended by FILL commands due to data under-run at its source node (#0). Thus, the packet traveling from node #5 to node #18 is blocked by the extended packet.

There are two common buffer design approaches to solve the dual problems of transmitter under-run and reducing packet latency. The first is to fully buffer the transmit data to ensure that an under-run condition never occurs. However, by storing all the transmit data before forwarding the data packet transmission latency is maximized.

The second approach, using a FIFO buffer to transmit data, is commonly used in local area networks (LANs) wide area networks (WANs). These networks have the option of extending or aborting a packet if under-run occurs. However, if the system extends the packet during data under-run then blocking of packets carrying data can occur as described above with reference to FIG. 1.

Accordingly, neither of the standard approaches presents an optimum solution for a high-performance SAN.

SUMMARY OF THE INVENTION

According to one aspect of the invention, a speculative transmit function is implemented utilizing a configurable logical buffer. At the start of packet transmission the logical buffer is configured as a FIFO so that data transmission begins immediately and latency is reduced by not delaying transmission until all data to be transmitted is fully buffered. However, if a data under-run occurs packet extension is allowed only for a fixed time period after which transmission of the packet data is abandoned.

According to another aspect of the invention, transmission of the data packet is abandoned immediately when data under-run occurs.

According to another aspect of the invention, abandonment of transmission is indicated by terminating a packet with a special symbol indicating that the packet is not to be processed or reported in error by intermediate routing nodes or its destination.

According to another aspect of the invention, subsequent to abandonment of packet transmission the logical buffer is reconfigured as a STORE-AND-FORWARD buffer and all transmission data is buffered prior to restarting transmission of the packet data.

According to another aspect of the invention, if subsequent to the occurrence of the data under-run, data becomes available prior to expiration of the fixed period then transmission of the packet data is not abandoned and continues.

Other features and advantages of the invention will be apparent in view of the following detailed description and appended drawings.

BRIEF DESCRIPTION OF THE DRAWINGS

FIG. 4 is a block diagram of the end node protocol stacks;

DESCRIPTION OF THE SPECIFIC EMBODIMENTS

A preferred embodiment of the invention will now be described in the context of a ServerNet™ layered protocol stack.

Figure 1:
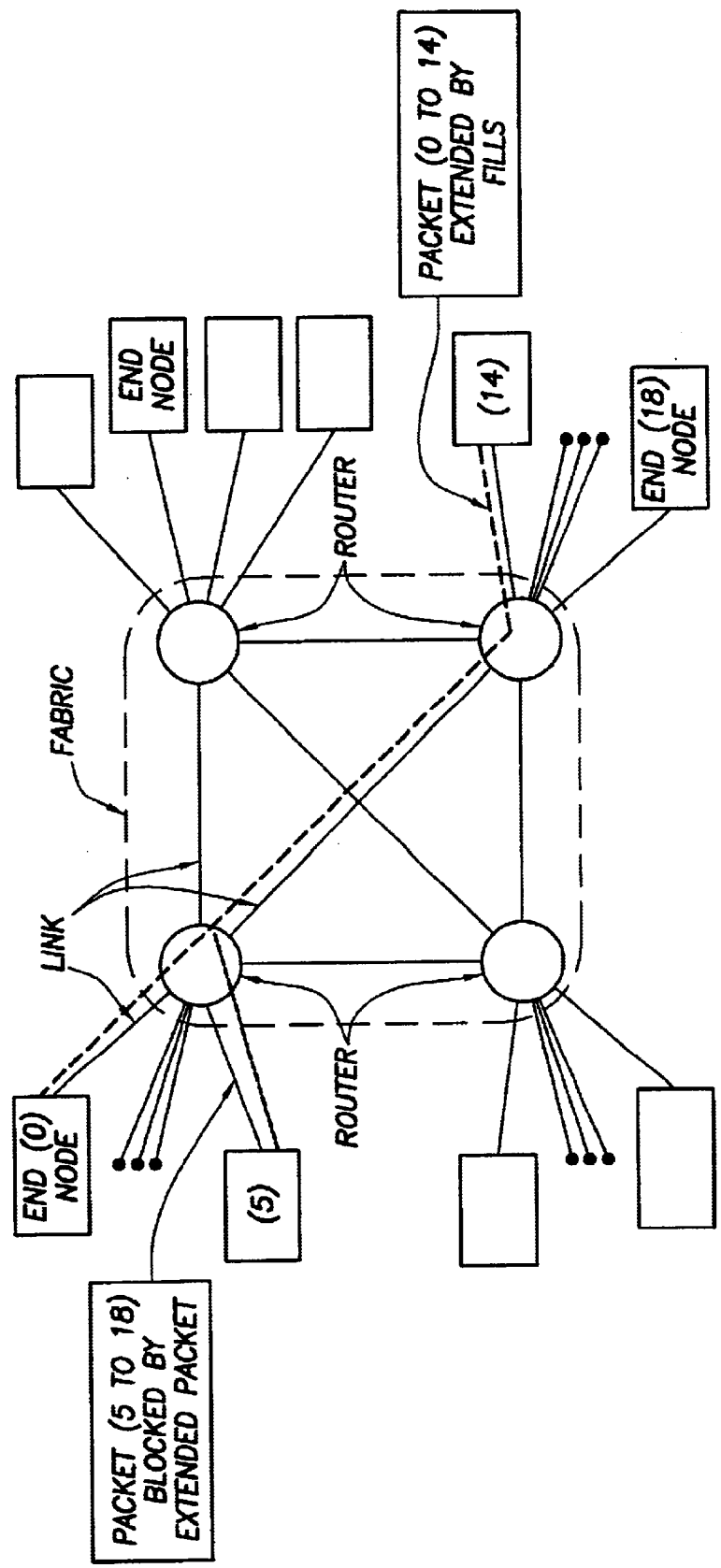
FIG. 1 is a diagram illustrating blocking of a packet.
Figure 2:
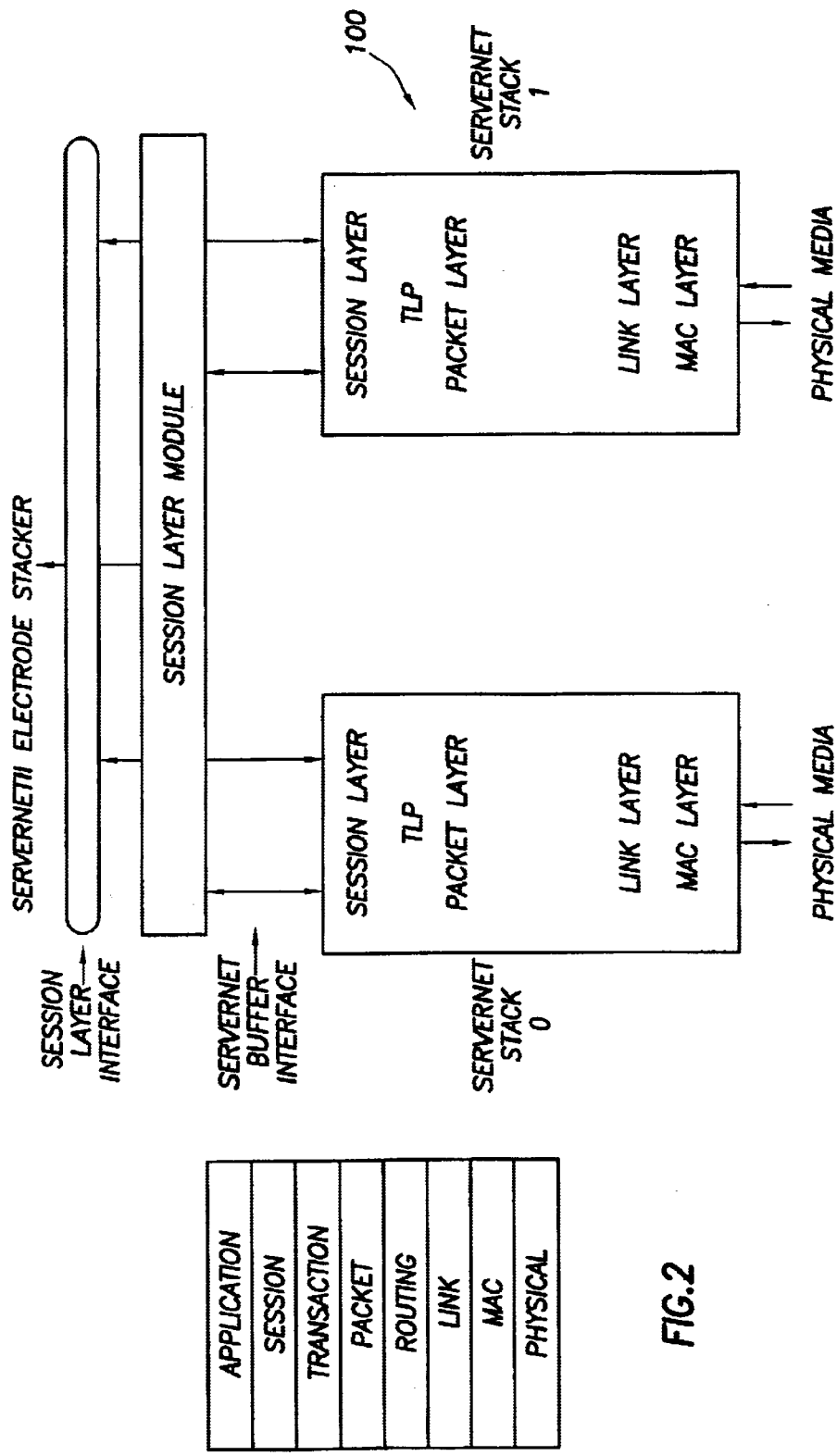
FIG. 2 is a block diagram of the layered protocol of a ServerNet™ host adapter.
Figure 3:
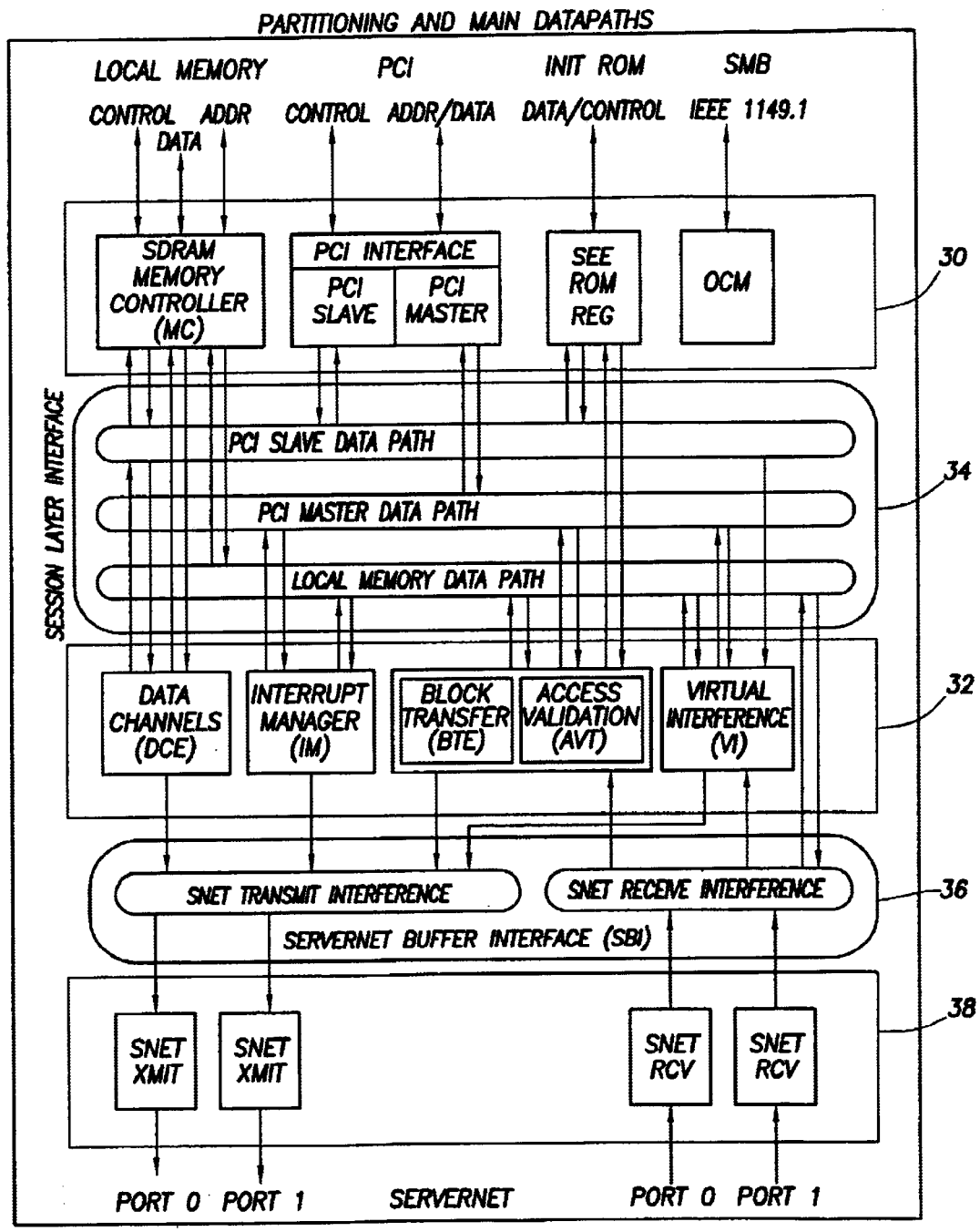
FIG. 3 is a block diagram depicting the modules and interfaces of a ServerNet™ host adapter.

FIG. 2 is a diagram of the layered protocol implemented in a host channel adapter having various interfaces and modules. The host channel adapter includes three primary layers of logic: the ServerNet™ stacks, the session layer modules, and the host side interface modules. These modules are depicted in FIG. 3. As stated above, the layer designated the "session layer" in the ServerNet™ description corresponds to the transaction layer described in other layered network protocols.

The host side interfaces 30 appear at the top of FIG. 3 and provide physical connections to host resources such as the PCI bus, local memory, etc. The session layer modules 32 are in the center of FIG. 3 and are connected between the Session Layer Interface 34 and the ServerNet™ Buffer Interface 36. The Session Layer provides the primary software interface and programming model and is the "data mover". The ServerNet™ stacks 38 appear at the bottom of FIG. 3 and provide a connection to ServerNet™ SAN.

Returning to FIG. 2. all layers below the session layer are implemented in a hardware module denoted the ServerNet™ stack. The session layer modules respond to certain conditions created either by operating system software or by application software. This is typically in the form of software creating a data structure that will be interpreted by session layer devices as an instruction with the necessary information needed to move data from memory in the local node to the ServerNet™ stack in order to have the data transmitted onto the ServerNet™ network.

Each session layer module has its own specific software interface, though all share a common interface, denoted the ServerNet™ Buffer Interface (SBI), to the ServerNet™ stack. The session layer modules perform the necessary actions to create descriptors and place them in the ServerNet™ transmit buffers. These descriptors contain all the information necessary for the stack to transmit a packet on the ServerNet™ network.

The ASIC contains two independent ServerNet™ II ports. Each port contains a transmit function and a receive function. The receive function of a port receives ServerNet™ request and response packets, creates inbound requests, and responses, and stores them in the port's receive buffer. The session layers modules read the request and response packet descriptors from the receive buffer and processes them in accordance with ServerNet™ transaction level protocols (e.g. creating appropriate response packet descriptors for inbound requests).

FIG. 4 shows an example interface between a single session layer module and the ServerNet™ stacks. The actual interface is expanded to allow multiple session layer modules to arbitrate for access to ServerNet™.

Figure 5:
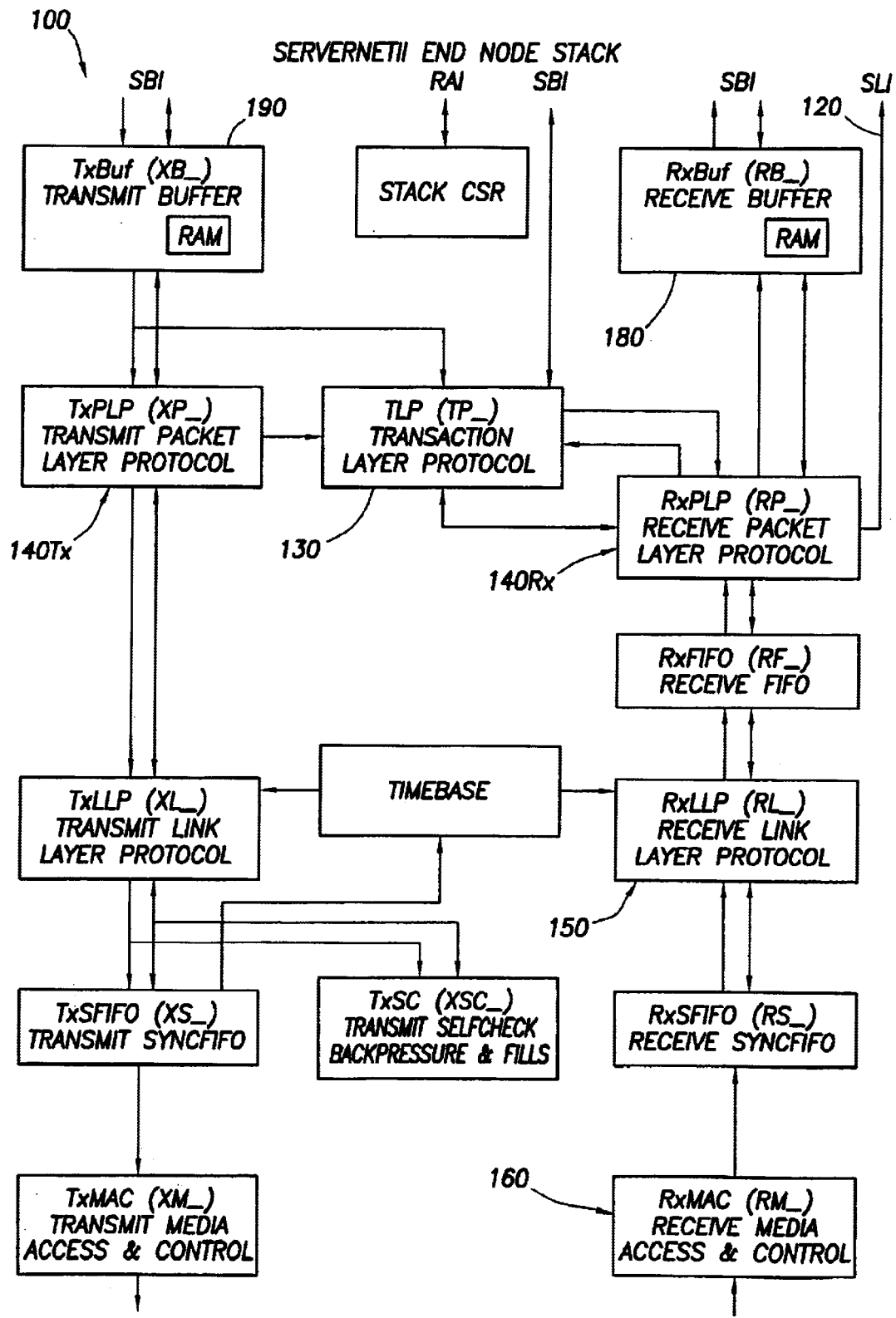
FIG. 5 is a more detailed block diagram of the end node protocol stacks.
Figure 6:
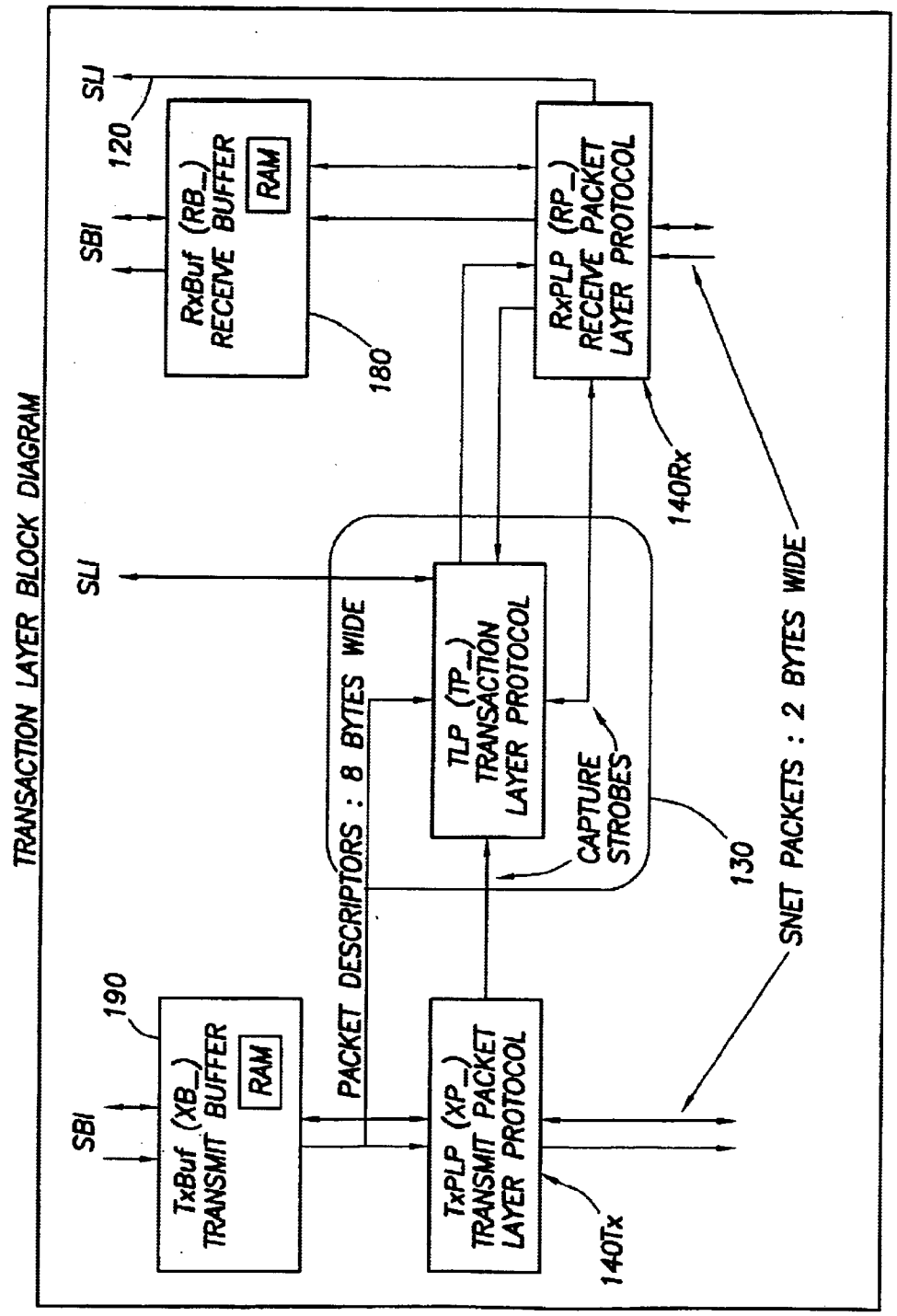
FIG. 6 is a block diagram of the transaction layer.

FIG. 5 depicts the hardware implementation of a ServerNet™ End Node stack. The Stack Layer Interface uses the memory mnemonics "transmit" and "receive". The data flow from the SBI through to the ServerNet™ Physical link may be in either direction. Each stack is independent of the other one since they do not share any modules.

The lower level stack checks link level protocols and presents received data to the upper level stack. The upper level stack checks packet and transaction level protocols, and places packets into buffers, sorted by packet type. These packets, along with certain other information, comprise a packet descriptor.

The available types of packet descriptors are indicated to the session layer modules, which may select the type of descriptor they will work on next. The session layers arbitrate for the use of the buffers, and process the selected packet descriptors.

The stack depicted in FIG. 5 is modularized by protocol layers and each layer is built from several modules. The functions of these layers and modules are described in detail in below.

1) Buffer Layer

The Buffer layer contains the Transmit Buffer (TxBuf) and Receive Buffer (RxBuf) modules.

2) Transaction Protocol Layer

The transaction protocol layer is made of a single module, the Transaction Layer Protocol (TLP) module.

3) Packet Layer

The Packet layer contains the Transmit Packet (TxPLP) and Receive Packet (RxPLP) Protocol Layer modules.

4) Link Layer

Transmit Link Layer Protocol (TxLLP)

Receive Link Layer Protocol (RxLLP)

Receive FIFO (RxFIFO) Timebase module

Transmit Self-Check (TxSC)

5) Media Access and Control Layer (MAC)

Transmit Synchronous FIFO (TxSFIFO)

Receive Synchronous FIFO (RxSFIFO)

Transmit Media Access and Control (TxMAC)

Receive Media Access and Control (RxMAC)

The upper level of the ServerNet™ stack corresponds to the Transaction Level Protocol layer in FIG. 2. The functions of the modules in this layer will now be described.

The Transmit Buffer Module provides the following features:

1. Arbitration Logic for the Session Layer Modules to gain ownership of the dual-port RAM buffers.

2. Arbitration Logic for the Session Layer Modules to gain ownership of the data and address buses.

3. A 256×64 dual-port RAM buffer for storing and retrieval of outbound ServerNet™ packet descriptors.

4. Required control to transfer data from the Session Layer Modules to packet descriptor RAM Buffers.

5. Required control to transfer data from the descriptor RAM Buffers to the Transmit Packet Layer Module.

The Packet Layer Protocol module provides the following primary features:

1) Translate between session layer packet descriptors and SNet packets.

2) Generate and check CRCs and packet terminators

3) Provide appropriately timed response strobes to the TLP

4) Timer Functions Under-run Watchdog Timer

5) Support for Big and Little Endian formats and translations for the data payloads The Link Layer Protocol modules provide the following primary features:

1) Check Link Layer Protocol

2) Encode and Decode packet data

3) Insert and Remove commands from the packet data stream

In the preferred embodiment, a speculative transmit protocol is utilized and the transmit buffer as a logical buffer that can be logically configured as either a STORE-AND-SEND buffer or a FIFO buffer. As described above, a FIFO is preferable to reduce transmit latency but, due to the transmission of an unpredictable number of FILL commands during data under-run, a simple FIFO is not usable in a ServerNet™ SAN.

The present implementation of speculative transfers involves cooperation between three blocks in the ServerNet™ transmit protocol stack, i.e., the requesting session block (RSB), the transmit buffer block (TBB), and the transmit packet layer protocol block (TPLB).

Figure 7:
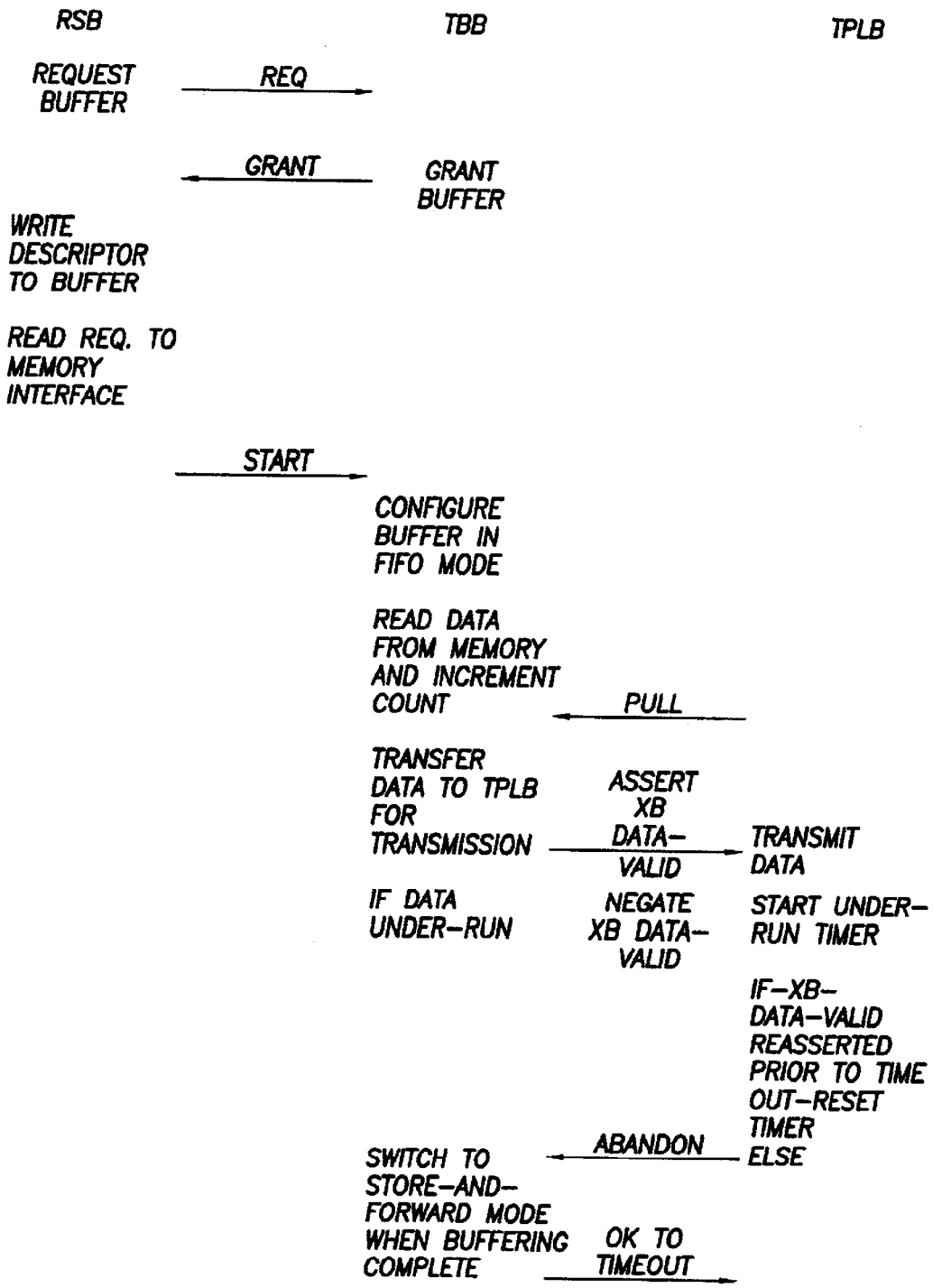
FIG. 7 is a flow diagram depicting the steps of a speculative transmit protocol.

An overview of the cooperation between the three blocks is depicted in flow chart of FIG. 7. At the start of a transmit transaction the RSB request a logical buffer from the TBB. The RSB then writes the packet header to the logical buffer, generates a read request to a memory interface, and sends a START to the TBB.

When the START is received, the TBB configures the logical buffer in the FIFO mode and immediately starts transferring data to the TPLB for packet transmission as data is being input to the FIFO from memory. The XB_Data_Valid signal is asserted as each word is transferred from the FIFO to the TPLB. Since data is transferred immediately, without waiting for the all the data to be transferred to be stored in the logical transmit buffer, the latency of the transmit operation is low.

However, if the input of data is slower that the rate of pulling data from the FIFO, e.g., if the data store has high latency, then valid data will not be present to be pulled and the XB_Data_Valid will not be asserted. As described above, the TPLB will cause FILL commands to be transmitted until XB_Data_Valid is again asserted.

To avoid significantly blocking other transmissions while no data is being transmitted by the current transmission, an under-run timer is started when XB_Data_Valid is de-asserted. If valid data is again ready to transmit prior to timing out of the under-run timer then the timer is reset. If the timer times out prior to re-assertion of XB_Data_Valid then the TPLB transition to ABORT and abandons transmission of the packet. If the timer is set to zero then TPLB transitions to ABORT immediately when XB_Data_Valid is de-asserted.

In response to the abandonment of the packet transmission the logical transmit buffer transitions to the STORE-AND-FORWARD state. After all data to be transmitted is stored in the logical transmit buffer the ready_to_transmit signal is asserted. Thus transmit latency is high because all data must be buffered prior to starting transmission.

The operation of the RSB, TBB, and TPLB is described in more detail by the following pseudo-code.

The session layer block initiates the process when there is a need to transmit a packet with a payload (data) segment.

```
//---------------------------------------------------------------
//      Get logical buffer and load packet header
//---------------------------------------------------------------
        Request large logical buffer
        Wait till buffer is available
        Write first eight byte word (EBW)
        Increment to TxBuff
        Write second EBW
        Increment to TxBuff
//---------------------------------------------------------------
//      Get the Transmit data
//---------------------------------------------------------------
        Read request to memory interface
        Wait for read data
        Send START to TxBuff block
        while (read not complete) {
        write EBW ofdata to TxBuff
        Increment to TxBuff
        }
        Release logical buffer
        End packet transmit sequence
```

The transmit buffer block manages multiple large and small logical buffers in a single on-chip static RAM. The following pseudo-code describes the management of a single large logical buffer after it has been allocated from the pool of large buffers.

```
//---------------------------------------------------------------
//Logical buffer has been allocated to a specific session layer block
//and its current state to granted for input
//---------------------------------------------------------------
while (buffer-granted-for-input) {        //Buffer is in STORE-AND-
                                          //FORWARD mode
        if (increment)
                word-count = word-count + 1
        if (write)
                sram (buffer-base + s1-address) = s1-data
        if (START)
                set-buffer-state = ok-to-transmit-and-input
        }
while (ok-to-transmit-and-input)          // Buffer is in FIFO mode
        if(word-count>0)
                TxBuff-data-available = True
        else
                TxBuff-data-available = False
        if (increment)
                word-count = word-count + 1
        if (write)
                sram (buffer-base + s1-address) = s1-data
        if (TP-Pull)                      // data used by
                                          // Transmit Packet layer
                word-count = word-count - 1
        if (not buffer-request)           // buffer loading is com-
                                          // plete
                set-buffer-state = ok-to-transmit
        if (TP-Abandon)                   // TP layer has abandoned
                                          // packet
                transmit set-buffer-state = buffer-granted-for-input
        }
while (buffer-granted-for-input) {        // Buffer is in STORE-
                                          // AND-FORWARD mode
        if (increment)
                word-count = word-count + 1
        if (write)
                sram (buffer-base + s1-address) = s1-data
        if (not buffer-request)           // buffer loading is com-
                                          // plete
                set-buffer-state = ok-to-transmit
        }
while (ok-to-transmit)                    // Complete Buffer is
                                          // available to transmit
        if (TP-Pop)
                set-buffer-state = free   // Return use buffer to free
                                          // buffer pool
        }
End packet transmit sequence
```

The transmit packet layer protocol block is responsible for processing packet descriptors presented by the transmit buffer block. The packet transmit sequence starts when the transmit buffer block present a new transmit descriptor. The sequence is complete when the transmit packet layer protocol block completes transmission and pops the packet (XP_Pop) or abandoned packet transmission (XP_Abort).

```
//---------------------------------------------------------------
//    The transmit sequence starts from an idle Tx PLP state
//---------------------------------------------------------------
        while (not XB-date-valid)
                {wait in idle state }
        Pull first EBW
        Decode and transmit header            //Transmit packet header
        while (payload count>zero) {          //Test of packet payload
                if (XB-date-valid) {
                        pull EBW
                        transmit data}        //Transmit packet payload
                else {
                        start timer           //Start under-run timer
                                while (not XB-date-valid){
                                        if (time-out) {
                                                set-XP_Abort = True    //Abandon packet
```

```
                                    // with long under-
                                    // run
            transmit TPB    //Transmit This Packet
                            // Bad symbol
                set-State = IDLE}
            else {wait}
        }
    }
transmit packet CRC         //Transmit Packet CRC
transmit TPG                //Transmit This Packet
                            // Good symbol End packet transmit sequence
```

The invention has now been described with reference to the preferred embodiments. Alternatives and substitutions will now be apparent to persons of skill in the art. Accordingly, it is not intended to limit the invention except as provided by the appended claims.

What is claimed is:

1. A method for transmitting a data packet, with data to be transmitted in said packet supplied from a data source, said method comprising the steps of:

requesting a buffer to store data to be transmitted;

upon starting packet transmission, configuring said buffer as a FIFO buffer;

while said buffer is configured as a FIFO:

storing data supplied by the data source;

outputting transmit data to be transmitted in said packet;

asserting a valid signal when data to be transmitted is stored in the buffer;

starting a data-under-run timer set to a timeout interval if the valid signal is not asserted;

abandoning packet transmission if the under-run timer times out because the valid signal is not reasserted prior to the time out interval;

if the packet transmission is abandoned, reconfiguring said buffer as a STORE-AND-FORWARD buffer to store all data to be transmitted provided by said data source prior to outputting data to be transmitted in a packet; and restarting packet transmission subsequent to storing all data to be transmitted in said buffer.

2. The method of claim 1 where said step of abandoning further comprises the act of:

terminating a packet with a special symbol indicating that the packet is not to be processed or reported in error by intermediate routing nodes or its destination.

3. A system for implementing a speculative transmit function comprising:

a session block which responds to packet transmit requests and includes logic for requesting a logical buffer to buffer a transmit packet, for writing data to the logical buffer, and for sending a START signal to begin packet transmission;

a logical buffer; configuration logic responsive to said START signal to configure the logical buffer as FIFO buffer, and asserting a DATA_VALID signal when data has been loaded into the logical buffer and is ready to transmit, and responsive to an ABANDON signal to configure the logical buffer as a STORE-AND-FORWARD buffer;

a transmit protocol block including logic for pulling data from said logical buffer when configured as a FIFO, for starting a timer that measures a fixed time interval when the DATA_VALID signal is not asserted, and for asserting the ABANDON signal if the timer indicates that the fixed time interval has expired.

4. A system for implementing a speculative transmit function comprising:

a session block which responds to packet transmit requests and includes logic for requesting a logical buffer to buffer a transmit packet, for writing data to the logical buffer, and for sending a START signal to begin packet transmission;

a logical buffer;

a transmit buffer block, coupled to said session block and said logical buffer, for managing the buffer, including buffer writing circuitry and buffer configuration logic responsive to said START signal to configure the logical buffer as FIFO buffer, and asserting a DATA_VALID signal when data has been loaded into the logical buffer and is ready to transmit, and responsive to an ABANDON signal to configure the logical buffer as a STORE-AND-FORWARD buffer;

a transmit protocol block including logic for pulling data from said logical buffer when configured as a FIFO, and for asserting the ABANDON signal when the DATA_VALID signal is not asserted.

* * * * *